(12) United States Patent
Kim et al.

(10) Patent No.: US 11,597,800 B2
(45) Date of Patent: Mar. 7, 2023

(54) SEPARATION AND RECOVERY METHOD OF POLYARLENE SULFIDE

(71) Applicant: LG CHEM, LTD., Seoul (KR)

(72) Inventors: Hansol Kim, Daejeon (KR); Joong Jin Han, Daejeon (KR); Sanghwan Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/049,242

(22) PCT Filed: Oct. 18, 2019

(86) PCT No.: PCT/KR2019/013772
§ 371 (c)(1),
(2) Date: Oct. 20, 2020

(87) PCT Pub. No.: WO2020/080899
PCT Pub. Date: Apr. 23, 2020

(65) Prior Publication Data
US 2021/0238354 A1  Aug. 5, 2021

(30) Foreign Application Priority Data
Oct. 19, 2018 (KR) .......................... 10-2018-0125504
Oct. 17, 2019 (KR) .......................... 10-2019-0129386

(51) Int. Cl.
*C08G 75/0281* (2016.01)
*C08G 75/0209* (2016.01)
*C08G 75/0254* (2016.01)

(52) U.S. Cl.
CPC ...... *C08G 75/0281* (2013.01); *C08G 75/0209* (2013.01); *C08G 75/0254* (2013.01)

(58) Field of Classification Search
CPC ................ C08G 75/14; C08G 75/0209; C08G 75/0254; C08G 75/0263; C08G 75/0268; C08G 75/0259; C08G 75/025; C08G 75/0281
See application file for complete search history.

(56) References Cited

U.S. PATENT DOCUMENTS

| | | | |
|---|---|---|---|
| 4,734,484 A | 3/1988 | Alfes et al. | |
| 4,789,729 A | 12/1988 | Nagira et al. | |
| 5,409,804 A | 4/1995 | Inaba et al. | |
| 2002/0143140 A1 | 10/2002 | Shirota | |
| 2004/0087758 A1* | 5/2004 | Shirota | C08G 75/0254 528/388 |
| 2008/0097075 A1 | 4/2008 | Matsuzaki et al. | |
| 2011/0178268 A1* | 7/2011 | Suzuki | C08G 75/0254 528/388 |
| 2015/0087805 A1* | 3/2015 | Nekkanti | B01D 11/0242 528/388 |

FOREIGN PATENT DOCUMENTS

| | | |
|---|---|---|
| CN | 103965476 A | 8/2014 |
| CN | 106633062 A | 5/2017 |

(Continued)

*Primary Examiner* — Shane Fang
(74) *Attorney, Agent, or Firm* — Dentons US LLP

(57) ABSTRACT

The present disclosure relates to a method of more efficiently separating and recovering a polyarylene sulfide exhibiting excellent strength, heat resistance, flame retardancy, and processability when processed into a molded product after polymerization.

10 Claims, 4 Drawing Sheets

(56) References Cited

FOREIGN PATENT DOCUMENTS

| | | |
|---|---|---|
| JP | 6286022 A | 4/1987 |
| JP | 63132941 | 6/1988 |
| JP | 61220446 A | 9/1989 |
| JP | 0593068 A | 4/1993 |
| JP | 05086184 A | 4/1993 |
| JP | 3042640 B2 | 5/2000 |
| JP | 2002293937 A | 10/2002 |
| JP | 2003113242 A | 4/2003 |
| JP | 3882562 B2 | 2/2007 |
| JP | 2011111548 A | 6/2011 |
| KR | 10-20180017438 A | 2/2018 |
| WO | 2006027985 A1 | 3/2006 |
| WO | 2018120954 A1 | 7/2018 |

\* cited by examiner

SEPARATION AND RECOVERY METHOD OF POLYARLENE SULFIDE

The present application is a National Phase entry pursuant to 35 U.S.C. § 371 of International Application No. PCT/KR2019/013772 filed on Oct. 18, 2019, and claims priority to and the benefit of Korean Patent Applications No. 10-2018-0125504 filed on Oct. 19, 2018 and No. 10-2019-0129386 filed on Oct. 17, 2019 with the Korean Intellectual Property Office, the disclosures of which are incorporated herein by reference in their entirety.

FIELD

The present disclosure relates to a method of more efficiently separating and recovering a polyarylene sulfide exhibiting excellent strength, heat resistance, flame retardancy, and processability when processed into a molded product after polymerization.

BACKGROUND

Polyarylene sulfide (PAS), which is represented by polyphenylene sulfide (PPS), has been widely used in automobiles, electrical and electronic products, machinery and the like to replace metals, especially die casting metals such as aluminum and zinc, due to its excellent strength, heat resistance, flame retardancy, and processability. Particularly, since the PPS resin has excellent flowability, it is suitable to use it as a compound by kneading with a filler such as glass fiber or a reinforcing agent.

Generally, PAS is prepared by polymerizing a sulfur source and a dihalogenated aromatic compound in the presence of an amide-based compound such as N-methyl pyrrolidone (NMP). Since the polymerization reaction of this method is a desalination polycondensation mechanism, a large amount of by-products such as sodium chloride are produced. Therefore, a process of removing the by-products is necessary after the polymerization reaction. However, it is difficult to completely remove the by-products in ordinary treatment, and commercially available general-purpose PPS products contain about thousands ppm of alkali metals. When alkali metal salts remain in the resulting polymer, deterioration of physical properties such as electrical properties may occur. Therefore, when a molded product prepared by using this PAS as a raw material is applied to electrical and electronic components, the deterioration of electrical properties by the alkali metal in PAS is a big obstacle.

Accordingly, various methods are currently known for removing by-products such as sodium chloride from the PAS component. For example, Japanese Patent Publication No. 1986-220446 discloses a method of repeatedly washing a reaction product containing PPS with water and hot water, and then washing with an acidic aqueous solution, followed by washing with ion-exchanged water, wherein PPS is obtained by reacting sodium hydrosulfide, sodium hydroxide and p-dichlorobenzene in N-methyl-2-pyrrolidone.

Specifically, in order to remove the metal compound (by-product) generated in the PAS manufacturing process, a mixture containing solid PAS and a metal compound is contacted with water and the metal compound is dissolved in water and removed from the PAS. However, this method requires a long washing time using a large amount of water to remove metal impurities, and thus a very large and complicated process necessarily results. In addition, there is a problem in that it is also necessary to treat a large amount of aqueous wastewater generated in the washing process, and process costs and the emission of environmental pollutants are high. Recently, a method of removing by-products such as sodium chloride from the PAS component has been known, in which the PAS component is separated by filtration using a vibrating mesh and sodium chloride is passed together with waste slurries. However, in this case, mesh holes are blocked by the sodium chloride fine powders, thereby reducing separation efficiency after several filtration processes.

Accordingly, there is a continuing demand for development of a process for more efficiently separating and recovering a polyarylene sulfide after polymerization without reducing separation efficiency, while minimizing the size of the entire process with minimized energy consumption and washing costs.

SUMMARY

The present disclosure is to provide a method of more efficiently separating and recovering a polyarylene sulfide exhibiting excellent strength, heat resistance, flame retardancy, and processability when processed into a molded product after polymerization.

The present disclosure is also to provide a preparation method of a polyarylene sulfide including the recovery process as described above.

According to one embodiment of the present disclosure, there is provided a separation and recovery method of a polyarylene sulfide, including a step of separating polyarylene sulfide particles by sedimentation, and then removing alkali metal halide particles by sedimentation from a mixed solution containing polyarylene sulfide particles, alkali metal halide particles and an amide-based compound using a decanter centrifugal separator at 1000 rpm to 2500 rpm.

According to another embodiment of the present disclosure, there is provided a preparation method of a polyarylene sulfide, including the steps of: dehydrating a hydrosulfide of an alkali metal and a hydroxide of an alkali metal in a mixed solvent of water and an amide-based compound to prepare a sulfur source including a sulfide of the alkali metal and the mixed solvent; adding a dihalogenated aromatic compound and an amide-based compound to a reactor containing the sulfur source to prepare polyarylene sulfide particles together with alkali metal halide particles, performing a polymerization reaction; and separating the polyarylene sulfide particles by sedimentation, and then removing the alkali metal halide particles by sedimentation from a mixed solution containing the polyarylene sulfide particles, the alkali metal halide particles and the amide-based compound, using a decanter centrifugal separator at 1000 rpm to 2500 rpm.

As described above, in the present disclosure, polyarylene sulfide particles may be first separated by sedimentation depending on the difference in particle size, and then alkali metal halide particles may be removed together with a waste liquid, without degrading separation efficiency due to the alkali metal halide particles. Therefore, the present disclosure may efficiently separate and recover polyarylene sulfide particles with high separation efficiency even if separated several times in succession.

DETAILED DESCRIPTION

Figure 1:
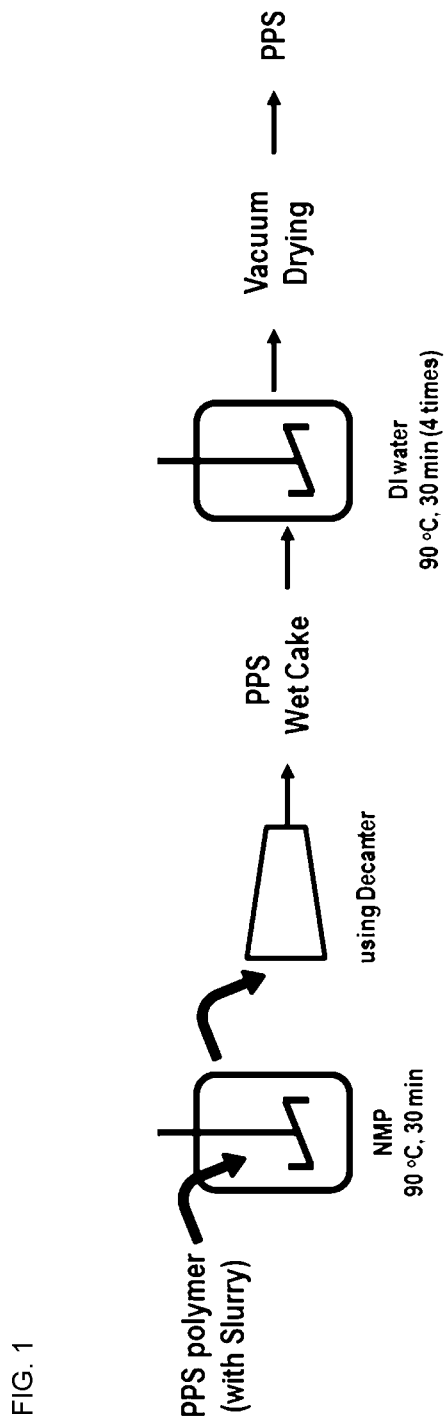
FIG. 1 is a schematic illustration of a process for recovering a polyarylene sulfide in Example 1 according to one embodiment of the present disclosure.

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

The present disclosure provides a method for efficiently recovering polyarylene sulfide particles from a mixed solution containing polyarylene sulfide particles and alkali metal halide particles.

In particular, the present disclosure can remove alkali metal halide particles with a waste liquid using a decanter centrifugal separator by separating polyarylene sulfide particles and then alkali metal halide particles by sedimentation depending on the difference in particle size in order to efficiently separate polyarylene sulfide particles from a waste liquid containing polyarylene sulfide particles produced in a polyarylene sulfide (PAS) manufacturing process and alkali metal halide particles as a by-product together with an amide-based compound. Therefore, the present disclosure may efficiently separate and recover polyarylene sulfide particles without degrading separation efficiency even if separated several times in succession.

According to one embodiment of the present disclosure, the separation and recovery method of a polyarylene sulfide includes a step of separating polyarylene sulfide particles by sedimentation, and then removing alkali metal halide particles by sedimentation from a mixed solution containing polyarylene sulfide particles, alkali metal halide particles and an amide-based compound using a decanter centrifugal separator at 1000 rpm to 2500 rpm.

In the separation and recovery method of a polyarylene sulfide, a decanter centrifugal separator is used instead of a conventional vibrating mesh, so that a problem of poor separation efficiency due to blocked mesh holes can be solved. That is, when the polyarylene sulfide particles are separated and recovered by filtration, the mesh holes are blocked by the alkali metal halide particles after several filtration processes, thereby reducing the separation efficiency. However, the present disclosure is characterized in that the separation efficiency does not decrease even if separated several times in succession.

In particular, the present disclosure uses the decanter centrifugal separator at 1000 rpm to 2500 rpm, and does not perform separation by sedimentation depending on the difference in specific gravity of particles which is commonly known. Specifically, the present disclosure is characterized in that, despite a high specific gravity of alkali metal halide particles such as sodium chloride, polyarylene sulfide particles are first separated and recovered due to the difference in sedimentation velocity depending on the difference in particle size.

The decanter centrifugal separator may be used at 1000 rpm to 2500 rpm to make a difference in sedimentation velocity depending on the difference in particle size. When the decanter centrifugal separator is used at higher than 2500 rpm, the sedimentation of alkali metal halides is accelerated, resulting in coming out with polyarylene sulfide (PAS), and thereby lowering the separation efficiency. When the decanter centrifugal separator is used at lower than 1000 rpm, the sedimentation takes a long time, thereby increasing an amount of waste liquid in the polyarylene sulfide (PAS).

At this time, the decanter centrifugal separator may be used at a temperature of room temperature to 180° C., and a pressure of normal pressure to 5 bar. Herein, the room temperature refers to an ambient temperature at normal pressure, and may be about 20° C. to about 28° C., or about 22° C. to about 26° C. In addition, the normal pressure refers to an atmospheric pressure without a separate reduced pressure or pressurized condition, and may be about 0.95 atm to about 1.1 atm, or about 0.95 bar to about 1.1 bar.

The specific kind of the decanter centrifugal separator that can be used in the separation and recovery process of a polyarylene sulfide according to the present disclosure is not particularly limited. For example, a decanter centrifugal separator is generally commercially available, and a commercially available one can be used in the present disclosure.

The decanter centrifugal separator is a device capable of separating a liquid-liquid mixture or a liquid-solid mixture by sedimentation, dehydration, concentration, etc. using centrifugal force. Generally, the decanter centrifugal separator is known to sediment and separate particles having a large specific gravity depending on the difference in specific gravity, that is, density of particles. However, the present disclosure is characterized in that the decanter centrifugal separator is operated under optimum conditions to separate polyarylene sulfide particles first by sedimentation and then remove alkali metal halide particles by sedimentation depending on the difference in particle size, not depending on the difference in specific gravity.

The present disclosure is to efficiently separate polyarylene sulfide particles from a waste liquid containing polyarylene sulfide particles produced in a polyarylene sulfide (PAS) manufacturing process, various inorganic salts and impurities. Accordingly, the mixed solution introduced into the decanter centrifugal separator may be a waste liquid or a mixed liquid thereof produced in a synthesizing or washing process of a polyarylene sulfide, and may further contain at least one selected from the group consisting of sodium hydroxide (NaOH), sodium acetate (NaOAc), sodium sulfide (Na$_2$S), sodium hydrosulfide (NaSH), and p-dichlorobenzene in addition to polyarylene sulfide particles, alkali metal halide particles and an amide-based compound.

Herein, specific examples of the polyarylene sulfide particles include polyphenylene sulfide (PPS).

The polyarylene sulfide particles may have a particle size of 100 micrometers (μm) to 2000 micrometers (μm), or 150 μm to 1800 μm.

For example, the particle size of polyarylene sulfide may be measured using standard mesh sieve having various sieve sizes such as 100 μm, 40 μm, or 10 μm. Specific conditions for measuring the particle size of polyarylene sulfide are not particularly limited. For example, the particle size may be measured after the polyarylene sulfide particles are stored at about 22° C. to 26° C. under a relative humidity of 60% to 78% for at least about 3 hours, preferably at least about 6 hours, at least about 9 hours, at least about 15 hours, or at least about 24 hours.

In addition, the polyarylene sulfide particles may have a density of 1 g/cm$^3$ to 1.5 g/cm$^3$, or 1.1 g/cm$^3$ to 1.45 g/cm$^3$.

For example, the density may be measured by the method of the American Society for Testing and Materials, ASTM D 1505.

Meanwhile, specific examples of the alkali metal halide particles produced as a by-product together with the polyarylene sulfide particles in the polyarylene sulfide (PAS) manufacturing process include sodium chloride (NaCl), sodium iodide (NaI), and the like, and any one or a mixture of two or more thereof may be used.

The alkali metal halide particles may have a particle size of 5 μm to 30 μm, or 6 μm to 28 μm.

In addition, the alkali metal halide particles may have a density of 1.9 g/cm$^3$ to 3 g/cm$^3$, or 2 g/cm$^3$ to 2.8 g/cm$^3$.

Herein, the size and density of the alkali metal halide particles may be measured in the same manner as the polyarylene sulfide particles.

In addition, the amide-based compound contained with the polyarylene sulfide particles produced in the polyarylene sulfide (PAS) manufacturing process and the alkali metal halide particles which are by-products is for centrifuging a slurry coming out after the polymerization, and may include a solvent usable in the polymerization process. Specific examples of the amide-based compound include amide compounds such as N,N-dimethylformamide or N,N-dimethylacetamide; pyrrolidone compounds such as N-methyl-2-pyrrolidone (NMP) or N-cyclohexyl-2-pyrrolidone; caprolactam compounds such as N-methyl-ε-caprolactam, imidazolidinone compounds such as 1,3-dialkyl-2-imidazolidinone; urea compounds such as tetramethyl urea; phosphoric acid amide compounds such as hexamethylphosphoric acid triamide; and the like, and any one or a mixture of two or more thereof may be used. Among them, the amide-based compound may preferably be N-methyl-2-pyrrolidone (NMP), which is frequently used in the polymerization process.

As described above, polyarylene sulfide particles may be first separated by sedimentation depending on the difference in particle size, and then alkali metal halide particles may be removed by sedimentation together with a waste liquid by using a decanter centrifugal separator according to the separation and recovery method of a polyarylene sulfide. Therefore, the present disclosure may efficiently separate and recover polyarylene sulfide particles without degrading separation efficiency even if separated several times in succession.

In particular, a moisture content of wet cake of the polyarylene sulfide which is separated and recovered after the filtration process according to the present disclosure without a separate drying process may be about 45 wt % or less, about 40 wt % or less, or about 35 wt % or less. A content of the alkali metal halides with respect to a weight of the polyarylene sulfide in the wet cake of polyarylene sulfide may be about 50 wt % or less, about 40 wt % or less, or about 30 wt % or less.

Meanwhile, according to another embodiment of the present disclosure, there is provided a preparation method of a polyarylene sulfide including the recovery process as described above.

The preparation method of a polyarylene sulfide includes the steps of: dehydrating a hydrosulfide of an alkali metal and a hydroxide of an alkali metal in a mixed solvent of water and an amide-based compound to prepare a sulfur source including a sulfide of an alkali metal and the mixed solvent (first step); adding a dihalogenated aromatic compound and an amide-based compound to a reactor containing the sulfur source to prepare polyarylene sulfide particles together with alkali metal halide particles, performing a polymerization reaction (second step); separating the polyarylene sulfide particles by sedimentation, and then removing the alkali metal halide particles by sedimentation from a mixed solution containing the polyarylene sulfide particles, the alkali metal halide particles and the amide-based compound, using a decanter centrifugal separator at 1000 rpm to 2500 rpm (third step).

The preparation method of a polyarylene sulfide according to another embodiment of the present disclosure will be described in each step.

The above-described first step is preparing a sulfur source.

The sulfur source is prepared by dehydrating a hydrosulfide of an alkali metal, and a hydroxide of an alkali metal in a mixed solvent of water and an amide-based compound. Therefore, the sulfur source may include the mixed solvent of water and an amide-based compound remaining after the dehydration, together with a sulfide of an alkali metal prepared by the reaction of the hydrosulfide of an alkali metal with the hydroxide of an alkali metal.

Meanwhile, the sulfide of an alkali metal may be determined depending on the type of the hydrosulfide of an alkali metal used in the reaction. Specific examples thereof include lithium sulfide, sodium sulfide, potassium sulfide, rubidium sulfide, and cesium sulfide, and any one or a mixture of two or more thereof may be used.

Specific examples of the hydrosulfide of an alkali metal that can be used in the preparation of the sulfur source by reacting the hydrosulfide of an alkali metal with the hydroxide of an alkali metal include lithium hydrogen sulfide, sodium hydrosulfide, potassium hydrogen sulfide, rubidium hydrogen sulfide, cesium hydrogen sulfide, and the like. Any one or a mixture of two or more thereof may be used, and an anhydride or a hydrate thereof may be used.

Specific examples of the hydroxide of an alkali metal include lithium hydroxide, sodium hydroxide, potassium hydroxide, rubidium hydroxide, cesium hydroxide and the like, and any one or a mixture of two or more thereof may be used. The hydroxide of an alkali metal may be used in an amount of 0.90 to 2.0 equivalents, more specifically 1.0 to 1.5 equivalents, and more particularly 1.0 to 1.2 equivalents, based on 1 equivalent of the hydrosulfide of an alkali metal.

In the present disclosure, the equivalent refers to molar equivalent (eq/mol).

Further, in the preparation of the sulfur source by the reaction of the hydrosulfide of an alkali metal with the hydroxide of an alkali metal, an organic acid salt of an alkali metal capable of promoting the polymerization reaction and raising the degree of polymerization of a polyarylene sulfide in a short period of time may be added as a polymerization assistant. Specific examples of the organic acid salt of an alkali metal include lithium acetate, sodium acetate, and the like, and any one or a mixture of two or more thereof may be used. The organic acid salt of an alkali metal may be used in an amount of about 0.01 to 1.0 equivalent, specifically about 0.01 to 0.8 equivalent, and more specifically about 0.05 to 0.5 equivalents, based on 1 equivalent of the hydrosulfide of an alkali metal.

The reaction between the hydrosulfide of an alkali metal and the hydroxide of an alkali metal may be carried out in a mixed solvent of water and an amide-based compound. Specific examples of the amide-based compound include amide compounds such as N,N-dimethylformamide or N,N-dimethylacetamide; pyrrolidone compounds such as N-methyl-2-pyrrolidone (NMP) or N-cyclohexyl-2-pyrrolidone; caprolactam compounds such as N-methyl-ε-caprolactam; imidazolidinone compounds such as 1,3-dialkyl-2-imidazolidinone; urea compounds such as tetramethyl urea; phosphoric acid amide compounds such as hexamethylphosphoric acid triamide; and the like, and any one or a mixture of two or more thereof may be used. Among them, the amide-based compound may preferably be N-methyl-2-pyrrolidone (NMP), considering a reaction efficiency and a cosolvent effect as a polymerization solvent for preparing a polyarylene sulfide.

The water may be used in an amount of about 1 to 8 equivalents, specifically about 1.5 to 5 equivalents, and more specifically about 2.5 to 5 equivalents, based on 1 equivalent of the amide-based compound.

Meanwhile, in the first step, a sulfide of an alkali metal may be prepared by dehydrating reactants containing a hydrosulfide of an alkali metal, a hydroxide of an alkali metal and the like. Herein, the dehydration reaction may be performed by stirring at about 100 rpm to 500 rpm at a temperature of about 130° C. to 205° C. More specifically, the dehydration reaction may be performed by stirring at about 100 to 300 rpm at a temperature of about 175° C. to 200° C. The dehydration reaction may be performed for about 30 minutes to 6 hours, or for about 1 hour to 3 hours.

During the dehydration reaction, the solvent such as water in the reactants may be removed by distillation or the like, and some of the amide-based compound may be discharged together with the water. In addition, some of the sulfur contained in the sulfur source may react with water by heat during the dehydration reaction, and may be volatilized as hydrogen sulfide gas.

As a result of the reaction of the hydrosulfide of an alkali metal, the hydroxide of an alkali metal and the alkali metal salt, a sulfide of an alkali metal is precipitated in a solid phase in a mixed solvent of water and an amide-based compound. Accordingly, when the sulfur source prepared by reacting the hydrosulfide of an alkali metal with the hydroxide of an alkali metal is used as a sulfur source in the preparation of a polyarylene sulfide according to the present disclosure, the molar ratio of the sulfur source refers to a molar ratio of the hydrosulfide of an alkali metal added during the reaction.

Subsequently, in order to remove the solvent such as water from the reaction product containing the sulfide of an alkali metal produced as a result of the above reaction, a dehydration process is performed. The dehydration process may be carried out according to a method well known in the art. The conditions are not particularly limited, and the specific process conditions are as described above.

Further, during the dehydration reaction, the sulfur contained in the sulfur source reacts with water to produce hydrogen sulfide and a hydroxide of an alkali metal, and the generated hydrogen sulfide is volatilized. Therefore, the amount of sulfur in the sulfur source remaining in the system after the dehydration reaction may be reduced by the hydrogen sulfide which is volatilized out of the system during the dehydration reaction. For example, when using the sulfur source mainly containing a hydrosulfide of an alkali metal, the amount of sulfur remaining in the system after the dehydration reaction is equal to the molar amount of sulfur in the introduced sulfur source minus the molar amount of hydrogen sulfide volatilized out of the system. Therefore, it is necessary to quantify the amount of effective sulfur contained in the sulfur source remaining in the system after the dehydration reaction from the amount of hydrogen sulfide volatilized out of the system. Specifically, the dehydration reaction is performed until the molar ratio of water to 1 mol of effective sulfur is 1 to 5, specifically 1.5 to 4, more specifically 1.75 to 3.5. When the water content in the sulfur source is excessively decreased by the dehydration reaction, water may be added to adjust the water content before the polymerization process.

Accordingly, the sulfur source prepared by the reaction of the hydrosulfide of an alkali metal with the hydroxide of an alkali metal and the dehydration as described above may include a mixed solvent of water and an amide-based compound together with a sulfide of an alkali metal, and the water may be included in a molar ratio of 1.75 to 3.5 based on 1 mol of sulfur contained in the sulfur source. In addition, the sulfur source may further include a hydroxide of an alkali metal prepared by the reaction of sulfur with water.

According to one embodiment of the present disclosure, the second step is polymerizing the sulfur source with a dihalogenated aromatic compound to prepare a polyarylene sulfide.

The dihalogenated aromatic compound usable for the preparation of the polyarylene sulfide is a compound in which two hydrogen atoms of an aromatic ring are substituted with halogen atoms. Specific examples thereof include o-dihalobenzene, m-dihalobenzene, p-dihalobenzene, dihalotoluene, dihalonaphthalene, dihalobiphenyl, dihalobenzoic acid, dihalodiphenyl ether, dihalodiphenylsulfone, dihalodiphenylsulfoxide, and dihalodiphenylketone, and any one or a mixture of two or more thereof may be used. In the dihalogenated aromatic compound, the halogen atom may be fluorine, chlorine, bromine or iodine. Among them, p-dichlorobenzene (p-DCB) may preferably be used in order to increase reactivity and suppress side reactions in the preparation of a polyarylene sulfide.

The dihalogenated aromatic compound may be added in an amount of about 0.8 to 1.2 equivalents based on 1 equivalent of the sulfur source. When the dihalogenated aromatic compound is added within the above range, a polyarylene sulfide having excellent physical properties may be obtained without lowering melting viscosity of the prepared polyarylene sulfide and increasing the content of chlorine present in the polyarylene sulfide. Considering the excellent effect of controlling the addition amount of the sulfur source and the dihalogenated aromatic compound, the dihalogenated aromatic compound may be added in an amount of about 0.9 to 1.1 equivalents.

Further, a step of lowering the temperature of the reactor containing the sulfur source to a temperature of about 150°

C. to 200° C. may be further included before the second step to prevent vaporization of the dihalogenated aromatic compound.

Further, the polymerization reaction of the sulfur source and the dihalogenated aromatic compound may be carried out in a solvent of an amide-based compound which is a polar aprotic organic solvent and stable to an alkali at a high temperature.

Specific examples of the amide-based compound are as described above, and pyrrolidone compounds such as N-methyl-2-pyrrolidone (NMP) or N-cyclohexyl-2-pyrrolidone are preferable considering the reaction efficiency.

Since the amide-based compound contained in the sulfur source in the first step functions as a co-solvent, the amide-based compound may be added in the second step in a molar ratio of water ($H_2O$) to the amide-based compound present in the polymerization system (a ratio of water/an amide-based compound) to be about 0.85 or more.

During the polymerization reaction, other additives such as a molecular weight regulator, a cross-linking agent and the like for controlling the polymerization reaction or the molecular weight may be further added in an amount not lowering physical properties and the yield of the polyarylene sulfide to be finally prepared.

The polymerization reaction of the sulfur source and the dihalogenated aromatic compound may be performed at about 200° C. to 300° C. Alternatively, the polymerization reaction may be performed in multiple steps, varying the temperature within the above-mentioned temperature range. Specifically, after the first polymerization reaction at about 200° C. or more and less than 250° C., the second polymerization reaction may be performed at a temperature higher than that of the first polymerization reaction, specifically at about 250° C. to 300° C.

The polyarylene sulfide produced as a result of the polymerization reaction is in the form of particles, and alkali metal halide particles are produced as a by-product together with the polyarylene sulfide particles.

The features related to the polyarylene sulfide particles and the alkali metal halide particles thus produced are as described above, and a detailed description thereof will be omitted.

According to one embodiment of the present disclosure, the third step is separating and recovering the polyarylene sulfide particles from the reaction product produced as a result of the polymerization reaction.

For separating and recovering the polyarylene sulfide particles, a mixed solution containing polyarylene sulfide particles, alkali metal halide particles and an amide-based compound is introduced into a decanter centrifugal separator, and the decanter centrifugal separator is operated at 1000 rpm to 2500 rpm to separate the polyarylene sulfide particles by sedimentation first, followed by sedimentation and removal of the alkali metal halide particles.

In another embodiment of the present disclosure, the features related to the separation and recovery process of polyarylene sulfide particles are as described above, and a detailed description thereof will be omitted.

Thereafter, the separated and recovered polyarylene sulfide particles may be optionally further washed, filtered or dried according to a conventional method.

As a specific preparation method of the polyarylene sulfide, following examples may be referred to. However, the preparation method of the polyarylene sulfide is not limited to this description. The preparation method may further include a step which is usually carried out in the technical field of the present invention, and the step(s) of the preparation method may be changed by the step(s) usually changeable.

Hereinafter, the present invention will be described in more detail with reference to the following preferred examples. However, these examples are for illustrative purposes only, and the invention is not intended to be limited by these examples.

EXAMPLES

Example 1

1-1. Preparation of Polyphenylene Sulfide

Sodium sulfide was prepared by mixing 70% sodium hydrosulfide (NaSH) and sodium hydroxide (NaOH) in an equivalent ratio of 1:1.05 to prepare a PPS polymer. At this time, 0.4 equivalent of sodium acetate ($CH_3COONa$) powder, 1.65 equivalents of N-methyl-2-pyrrolidone (NMP), and 4.72 equivalents of deionized water (DI water) were added to the reactor. Herein, the equivalent refers to molar equivalent (eq/mol). At this time, the solid reagent was added first, followed by NMP, DI water. Then, the reactor was stirred at about 150 rpm and heated to about 195° C. for 1 hour and 40 minutes to dehydrate. Thereafter, the temperature of the reactor was lowered to about 175° C., and 1.02 times more equivalent of para-dichlorobenzene (p-DCB) than sodium hydrosulfide and 1.35 equivalents of N-methyl-2-pyrrolidone (NMP) were added to the reactor. Thereafter, the reaction mixture was heated to about 230° C. and reacted for about 2 hours as a front reaction, and further heated to about 255° C. and reacted for about 2 hours as a rear reaction, followed by addition of 3 equivalents of distilled water and stirring for about 5 minutes. As a result, 500 g of a slurry containing PPS polymer particles was obtained. The slurry contained polyarylene sulfide particles, alkali metal halide particles, and an amide-based compound.

Figure 2:
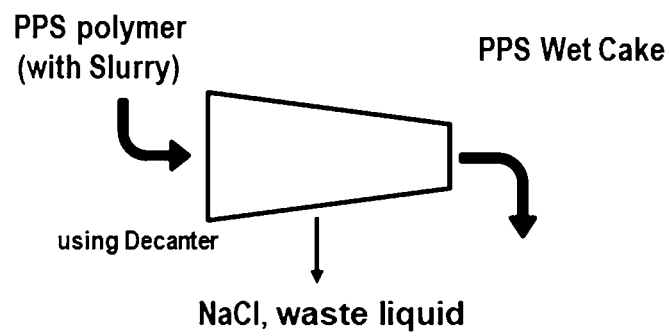
FIG. 2 is a schematic illustration of a process of removal of alkali metal halide particles by sedimentation after separating polyarylene sulfide particles by sedimentation in a decanter centrifugal separator according to Example 1.

1-2. Separation and Recovery of Polyphenylene Sulfide 100 g of the slurry produced in step 1-1 was aliquoted and filtered using a decanter centrifugal separator to separate and recover a polyarylene sulfide as a PPS wet cake as shown in FIG. 1. At this time, the decanter centrifugal separator, as shown in FIG. 2, was operated at 1000 rpm under room temperature and normal pressure conditions.

The time taken to filter 100 g of the PPS slurry produced by repeating the above process was 0.3 hour including additional time for adding, etc., and a total amount of the PPS wet cake separated and recovered was 24.5 g (moisture content: 31%). NaCl content with respect to PPS was about 20%.

Comparative Example 1

Figure 3:
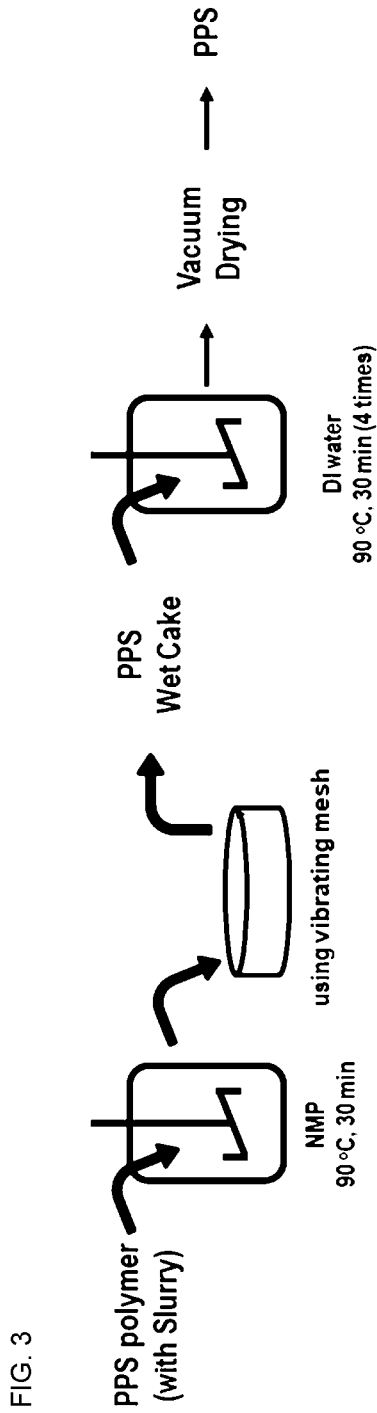
FIG. 3 is a schematic illustration of a process for recovering a polyarylene sulfide in Comparative Example 1 according to the prior art.
Figure 4:
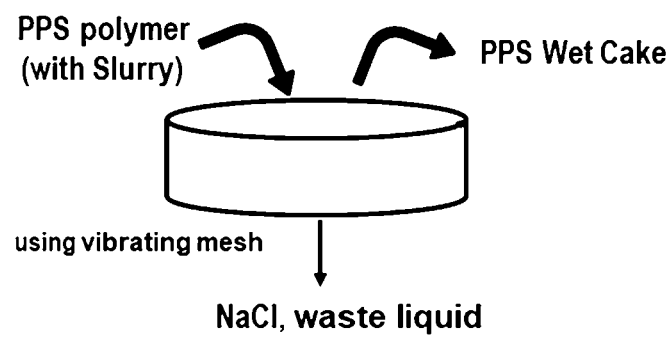
FIG. 4 is a schematic illustration of a process of filtering polyarylene sulfide particles in a vibrating mesh according to Comparative Example 1 to separate and recover them on the upper part, followed by removing alkali metal halide particles by passing them downward.

The separation and recovery process of a polyarylene sulfide was performed in the same manner as in Example 1, except that a PPS wet cake was obtained by performing filtration at room temperature and normal pressure using a vibrating mesh (see FIG. 4) instead of the decanter centrifugal separator, as shown in FIG. 3, in performing the separation and recovery process of 100 g of the slurry produced in step 1-1 of Example 1.

The time taken to filter 100 g of the PPS slurry produced by repeating the above process was 0.3 hour, and a total amount of the PPS wet cake separated and recovered was 41.4 g (moisture content: 104%). NaCl content with respect to PPS was about 80%, from which it can be seen that separation efficiency was greatly reduced.

Comparative Example 2

The separation and recovery process of a polyarylene sulfide was performed in the same manner as in Example 1, except that the decanter centrifugal separator was operated at 4000 rpm in performing the separation and recovery process of 100 g of the slurry produced in step 1-1 of Example 1.

The time taken to filter 100 g of the PPS slurry produced by repeating the above process was 0.3 hour including additional time for adding, etc., and a total amount of the PPS wet cake separated and recovered was 40.5 g (moisture content: 33%). NaCl content with respect to PPS was about 52%, from which it can be seen that separation efficiency was greatly reduced.

The invention claimed is:

1. A separation and recovery method comprising:
    introducing a mixed slurry comprising polyarylene sulfide particles, alkali metal halide particles and an amide-based compound into a decanter centrifugal separator,
    operating the decanter centrifugal separator at a speed of 1000 rpm to 2500 rpm such that the polyarylene sulfide particles are first settled and separated from the mixed slurry, and then the alkali metal halide particles are settled and removed from the mixed slurry,
    wherein the polyarylene sulfide particles in the mixed slurry have a particle size of 100 micrometers to 2000 micrometers, and wherein the alkali metal halide particles in the mixed slurry have a particle size of 5 micrometers to 30 micrometers.

2. The separation and recovery method according to claim 1, wherein the mixed slurry is a waste liquid produced in a synthesizing or washing process of the polyarylene sulfide.

3. The separation and recovery method according to claim 1, wherein the polyarylene sulfide particles in the mixed slurry have a density of 1 g/cm$^3$ to 1.5 g/cm$^3$.

4. The separation and recovery method according to claim 1, wherein the alkali metal halide particles comprise at least one selected from the group consisting of sodium chloride and sodium iodide.

5. The separation and recovery method according to claim 1, wherein the alkali metal halide particles have a density of 1.9 g/cm$^3$ to 3 g/cm$^3$.

6. The separation and recovery method according to claim 1, wherein the amide-based compound comprises at least one selected from the group consisting of N,N-dimethylformamide, N,N-dimethylacetamide, N-methyl-2-pyrrolidone (NMP), N-cyclohexyl-2-pyrrolidone, N-methyl-ε-caprolactam, 1,3-dialkyl-2-imidazolidinone, tetramethyl urea, and hexamethyl phosphate triamide.

7. The separation and recovery method according to claim 1, wherein the mixed slurry further comprises at least one selected from the group consisting of sodium hydroxide, sodium acetate, sodium sulfide, sodium hydrosulfide, and p-dichlorobenzene.

8. A preparation method of a polyarylene sulfide, comprising:
    dehydrating a hydrosulfide of an alkali metal and a hydroxide of an alkali metal in a mixed solvent of water and an amide-based compound to prepare a sulfur source comprising a sulfide of an alkali metal and the mixed solvent;
    adding a dihalogenated aromatic compound and an amide-based compound to a reactor containing the sulfur source, and performing a polymerization reaction, thus forming a mixed slurry comprising polyarylene sulfide particles, alkali metal halide particles, and the amide-based compound;
    introducing the mixed slurry into a decanter centrifugal separator, and
    operating the decanter centrifugal separator at a speed of 1000 rpm to 2500 rpm, such that the polyarylene sulfide particles are first settled and separated from the mixed slurry, and then the alkali metal particles are settled and removed from the mixed slurry, wherein the polyarylene sulfide particles in the mixed slurry have a particle size of 100 micrometers to 2000 micrometers, and wherein the alkali metal halide particles in the mixed slurry have a particle size of 5 micrometers to 30 micrometers.

9. The separation and recovery method according to claim 1, wherein the polyarylene sulfide particles in the mixed slurry have a particle size of 150 micrometers to 1800 micrometers, and wherein the alkali metal halide particles in the mixed slurry have a particle size of 6 micrometers to 28 micrometers.

10. The separation and recovery method according to claim 8, wherein the polyarylene sulfide particles in the mixed slurry have a particle size of 150 micrometers to 1800 micrometers, and wherein the alkali metal halide particles in the mixed slurry have a particle size of 6 micrometers to 28 micrometers.

* * * * *